H. W. B. PHELPS.
CONVERTIBLE BRUSH.
APPLICATION FILED APR. 26, 1916. RENEWED MAY 7, 1918.
1,278,074.
Patented Sept. 3, 1918.
2 SHEETS—SHEET 1.
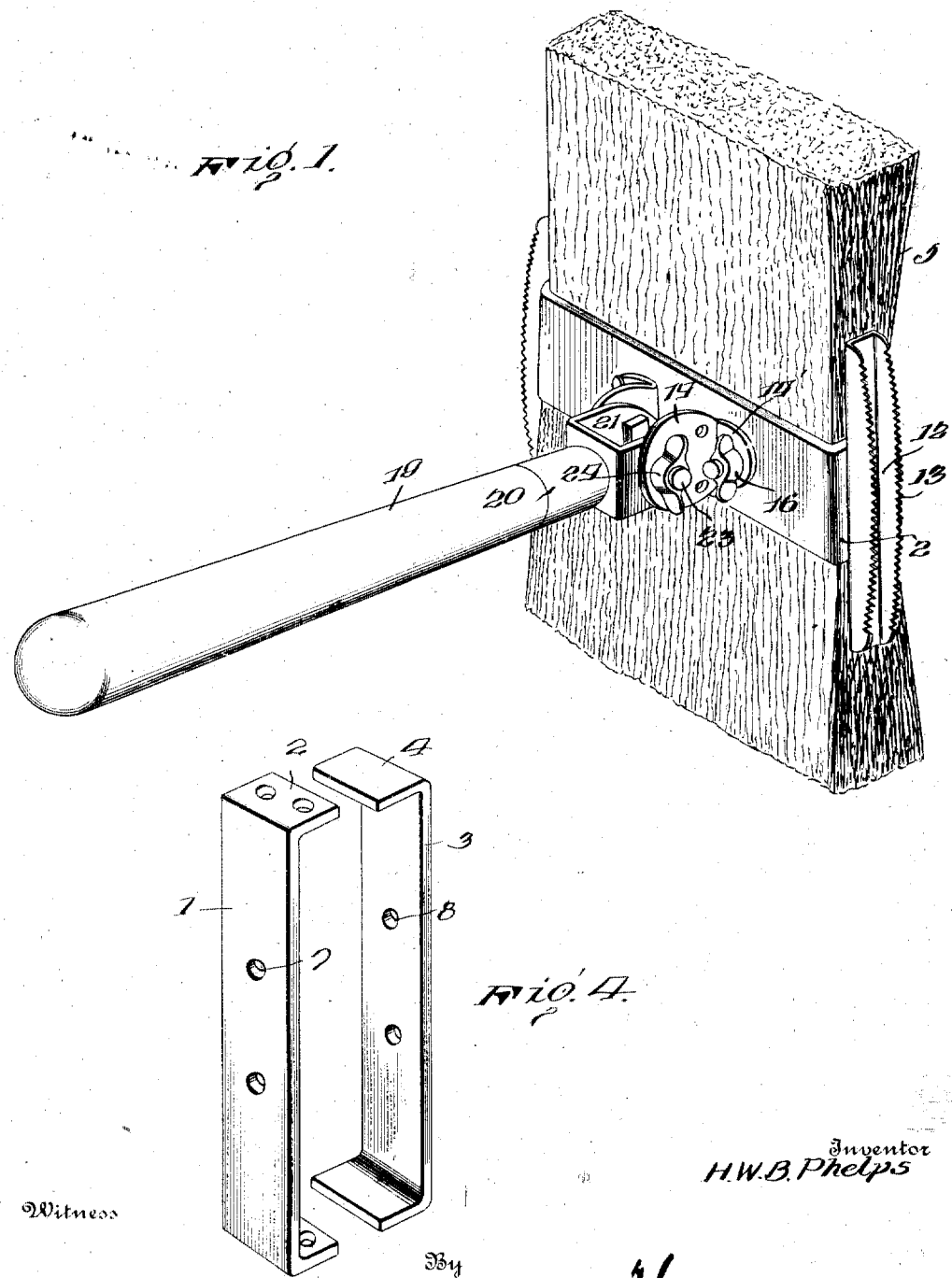
Inventor
H.W.B. Phelps
Witness
By
Attorneys.

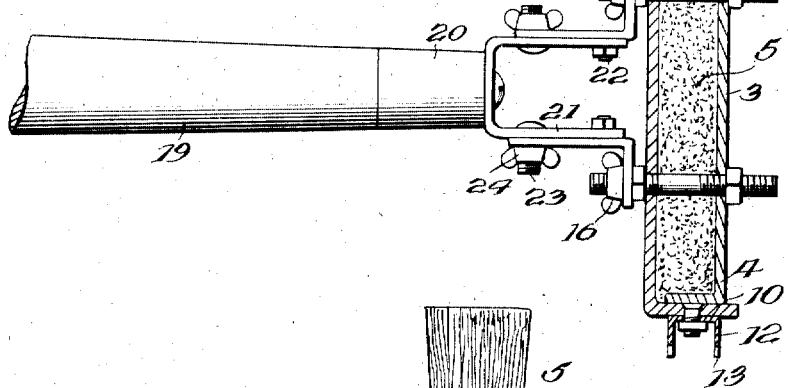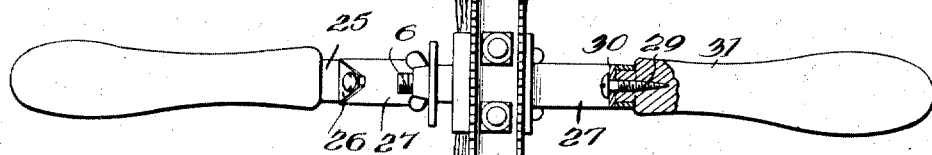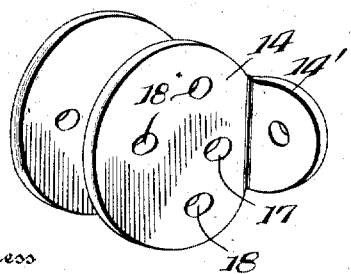

UNITED STATES PATENT OFFICE.

HENRY W. B. PHELPS, OF MATTOON, ILLINOIS.

CONVERTIBLE BRUSH.

1,278,074.　　　Specification of Letters Patent.　　Patented Sept. 3, 1918.

Application filed April 26, 1916, Serial No. 93,678. Renewed May 7, 1918. Serial No. 233,171.

*To all whom it may concern:*

Be it known that I, HENRY W. B. PHELPS, a citizen of the United States, residing at Mattoon, in the county of Coles and State of Illinois, have invented certain new and useful Improvements in Convertible Brushes, of which the following is a specification.

This invention relates to convertible implements which may be employed with advantage about stables and barns and which may be readily adapted for use for one purpose or another as may be found desirable.

It is one aim of the invention to provide an implement of this class including a clamping frame within which may be arranged a mass of straws, bristles, or fibers, or, in fact, any material which it may be desired to employ and which will, of course, vary in character in accordance with the work to be done so that stiff bristles may be arranged within the frame if it is desired to use the implement as a stable broom or a mass of fibers of suitable texture may be arranged within the frame if it is desired to use the implement as a paint brush or a white-wash brush, or bristles or straws of a different texture may be arranged within the frame and the device, by reason of the presence at the ends of the frame of curry comb members, may be employed as a curry comb and horse brush. Furthermore, the implement embodying the present invention is so constructed as to permit of the application thereto of different types of handles depending upon the use to which the invention is to be put and in one form of handle attachment the handle is adjustable angularly with relation to the body of the implement so that the handle may stand upright with relation to the said body to permit of the implement being employed as a broom or it may be adjusted to extend at right angles with relation to the body when the implement is to be employed as a white-wash brush or as a paint brush and under conditions where it is desirable to use a relatively long handle.

Another aim of the invention is to so construct the members comprising the clamping frame that the said members may be readily and conveniently separated so as to permit of renewal of the bristles or other material clamped within the frame, thereby adding to the life of the implement.

In the accompanying drawings:

Figure 1 is a perspective view of the device, the view illustrating one form of handle employed in connection therewith.

Fig. 2 is a horizontal sectional view through the structure shown in Fig. 1.

Fig. 3 is a perspective view of the members provided for mounting the handle shown in Figs. 1 and 2.

Fig. 4 is a perspective view of the brush clamping members of the device.

Fig. 5 is a side elevation of the device provided with a modified form of handle.

Fig. 6 is a perspective view of the handle ferrule shown in Fig. 5.

The device embodying the present invention includes a head comprising coacting clamping members designed to bind the straws or bristles comprising the broom or brush as the case may be and these clamping members are clearly shown in Fig. 4 of the drawings. Each of the members is preferably formed from a suitable length of bar metal and one of these members comprises a clamping or body portion 1 having its ends bent to extend at right angles from the plane occupied by the said body portion as indicated by the numeral 2. The other clamping member comprises a body portion 3 having ends 4 corresponding to the ends 2 of the member 1. The member 3, however, is slightly shorter than the member 2 so that the members may be assembled with the ends 4 of the member 3 extending beside the inner faces of the ends 2 of the member 1, as shown in Fig. 2 of the drawings, it being understood that the straws or bristles, or any other material which may take the place thereof, are to be clamped and confined between these two members. In the drawings the straws or bristles are indicated by the numeral 5 and are laid between the members 1 and 3 with their intermediate portions surrounded by the said members, after which the members are drawn together to clamp the mass of straws or the like by means of bolts as will now be explained. Ordinarily two of the bolts mentioned will be employed and these bolts are indicated by the numeral 6 and are fitted through openings 7 and 8 formed in the members 1 and 3, as clearly shown in Figs. 2 and 4 of the drawings. The bolts 6 are threaded throughout their opposite end portions and fitted upon the threaded end portions of each bolt is a nut 9 designed to bear against the clamping member 1 or 3 as the case may be, these nuts 9 being tightened to the desired extent so as to cause the clamping members to firmly bind the mass of straw or bristles. The bolts 6 are of such length that after the nuts 9 have been tightened in the manner stated the threaded ends of the bolts will extend a sufficient distance beyond the nuts to permit of the attachment, in a manner to be presently explained, of the handle or handles of the implement.

In order that the implement may be employed as a curry comb, each end 2 of the clamping member 1 supports a comb section comprising an attaching portion 10 riveted or otherwise secured as at 11 to the respective end 2 and spaced flanges or side portions 12 which have toothed outer edges 13. The comb members extend transversely of the ends 2 as will be observed by reference to Figs. 1 and 5 of the drawings, and these members and the straws 5 are so proportioned as concerns their relative lengths that the straws will project at their ends considerably beyond the ends of the said comb members and, therefore, in effect the device embodies two brush or broom heads, either of which may be employed and, of course, either curry comb member may be made use of, as found desirable or convenient.

The form of handle shown in Figs. 1, 2 and 3 of the drawings includes attaching bracket members, each comprising a body portion 14 having a perforated attaching ear 14', the opening in which is designed to receive the end of one of the bolts 6 as shown in Fig. 2, a wing nut being threaded onto the said end of the bolt for the purpose of securing the bracket member in place. When a pair of the bracket members have been assembled with the ends of the bolts 6 at one side of the device in the proper manner, the body portions 14 of the said bracket members will occupy parallel planes and will be suitably spaced with respect to each other. Each of the said body portions is provided with an opening 17 and with a series of openings 18 equidistant from the opening 17. The handle proper is indicated by the numeral 19 and is provided with a ferrule 20 which is fitted to its end and which has spaced ears 21 designed to project beyond the body portions 14 of the said bracket members, as shown in Figs. 1 and 2. Bolts 22 are fitted through the said ears and through the openings 17 and serve to connect the ears or, in other words, the handle as a whole for angular adjustment with relation to the said bracket members and to the remainder of the device. In order that the handle may be held in the desired adjusted position, bolts 23 are carried by the ears 21 and are engageable interchangeably in the openings 18 and wing nuts 24 are threaded on to the bolts and may be tightened so as to bind against the body portions 14 of the bracket members for the purpose stated. It will now be understood that the handle above described may be applied to the main portion of the device at either side thereof and without disturbing the adjustment of the clamping members 1 and 3, inasmuch as it is not necessary to loosen the nuts 9 in removing or applying the handle. Therefore, whenever desired, the handle just described may be removed and one or two handles such as shown in Figs. 5 and 6 of the drawings, may be substituted therefor. Each of these handles comprises a tubular ferrule 25 provided at its forward end with outstanding integral ears 26 through which and the arch of a yoke 27 are secured rivets or other suitable fastening devices 28, a screw or the like, indicated by the numeral 29, being fitted through an opening 30 in that portion of the yoke 27 which is opposite the said forward end of the ferrule and being driven into the handle which is indicated by the numeral 31 and which is fitted into the ferrule in the usual manner. The arch of the yoke 27 is provided at its end with apertured attaching ears 32 to receive the projecting ends of the bolts 6 in the manner shown in Fig. 5 of the drawings. It will be observed that this figure illustrates the arrangement of the device when the same is to be employed as a curry comb and horse brush and it will be understood that either or both of the handles illustrated in the said figure may be employed.

From the foregoing description of the invention, it will be understood that at the time of sale the brush may be adapted to the use to which it is to be put or, if desired, the brush, together with the two forms of handles and several sets of brush heads or the like may be supplied to the purchaser and he may then substitute one kind of brush head for another and also substitute one type of handle for another. Of course, it will be apparent that the brush may always be put to the same use or, if desired, for example, if the brush has been in use for a considerable length of time as a curry comb it may be readily converted into a white-wash brush by removing the bristles which served originally to adapt the implement for use as a horse brush and substitute therefor bristles adapting the device for use as a white-wash brush, the long handle being substituted for either or both of the short handles Then, after the job of white-washing has been completed the white-wash bristles may be removed and the clamping frame for the bristles may be cleaned as also the comb members and bristles substituted for the white-wash bristles adapting the brush for use again as a horse brush, the shorter handle or handles being substituted, of course, for the long handle.

Having thus described the invention, what is claimed as new is:

1. In a device of the class described, coacting clamping members designed to embrace and bind brush material or the like disposed between them, bolts fitted through the said members and each provided at one end with an abutment bearing against one of the members, a nut threaded upon the other end of each bolt, a handle having portions fitted to the last mentioned ends of the bolts, and other nuts threaded upon the last mentioned ends of the bolts, and securing the said handle portions to the said bolts.

2. In a device of the class described, coacting clamping members designed to embrace and bind a mass of brush material or the like disposed between them, bolts fitted through the said portions and having their opposite ends threaded, a nut threaded upon one end of each bolt, the said nuts bearing against one of the clamping members, other nuts threaded upon the other ends of the bolts and bearing against the other clamping member, and a handle having portions designed to be fitted selectively to the first or last mentioned ends of the bolts, and other nuts designed to be threaded selectively on to the said ends of the bolts and to secure the said handle portions thereto.

3. In a device of the class described, a head comprising brush material clamping members, a curry comb section carried by one of the said members and extending beside the brush material bound by the said head, and a handle connected with one of the said clamping members.

4. In a device of the class described, a head comprising brush material clamping members, a curry comb section carried by one of the said members and extending beside the brush material bound by the said head, and a handle connected with one of the said clamping members, the handle being angularly adjustable with relation to the said head.

In testimony whereof I affix my signature.

HENRY W. B. PHELPS. [L. S.]